US010083432B2

(12) United States Patent
Tajima

(10) Patent No.: US 10,083,432 B2
(45) Date of Patent: Sep. 25, 2018

(54) TRANSACTION SYSTEM AND INFORMATION PROCESSING METHOD

(71) Applicant: Seiko Epson Corporation, Tokyo (JP)

(72) Inventor: Shigeo Tajima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 314 days.

(21) Appl. No.: 14/808,429

(22) Filed: Jul. 24, 2015

(65) Prior Publication Data

US 2016/0042336 A1    Feb. 11, 2016

(30) Foreign Application Priority Data

Aug. 5, 2014 (JP) ................................. 2014-159222
Apr. 28, 2015 (JP) ................................. 2015-091073

(51) Int. Cl.
    *G06Q 20/00*      (2012.01)
    *G06Q 20/20*      (2012.01)
    *G07G 1/14*      (2006.01)

(52) U.S. Cl.
    CPC ............. *G06Q 20/202* (2013.01); *G07G 1/14* (2013.01)

(58) Field of Classification Search
    CPC ............. G07G 1/14; G06Q 20/20; G06K 5/00
    USPC .......................................... 705/21; 235/380
    See application file for complete search history.

(56) References Cited

U.S. PATENT DOCUMENTS

| | | | | |
|---|---|---|---|---|
| 6,758,393 B1 * | 7/2004 | Luciano | ................. | G06Q 20/20 235/379 |
| 8,820,635 B2 * | 9/2014 | Rothschild | ............. | G06Q 20/20 235/379 |
| 9,342,264 B2 * | 5/2016 | Takasu | .................. | G06F 3/1209 |
| 9,671,230 B2 * | 6/2017 | Sahay | ..................... | G01C 21/20 |
| 2003/0004811 A1 * | 1/2003 | Omori | ............... | G06Q 20/0453 705/17 |
| 2003/0046119 A1 * | 3/2003 | Yamamoto | ............. | G06Q 10/02 705/5 |
| 2003/0055792 A1 * | 3/2003 | Kinoshita | .............. | G06Q 20/04 705/67 |
| 2008/0012701 A1 * | 1/2008 | Kass | .................... | A61B 5/0002 340/539.11 |

(Continued)

FOREIGN PATENT DOCUMENTS

CN      201302736 Y      9/2009
CN      103116846 A      5/2013

(Continued)

*Primary Examiner* — Oluseye Iwarere
(74) *Attorney, Agent, or Firm* — Foley & Lardner LLP

(57) ABSTRACT

The POS system 5 of a transaction system 1 transmits transaction information, which is information related to a transaction, and transaction time information indicating the time a transaction was made, to a control server 10 during a transaction. A terminal 14 detects if the terminal 14 performed a specific movement, and transmits a customer ID and executed time information indicating when the terminal 14 performed the specific movement to the control server 10 when the specific movement is detected. Based on the transaction time information received from the POS system 5 and the executed time information received from the terminal 14, the control server 10 determines if the information matches, and if it does, relationally stores the transaction information received with the transaction time information and the customer ID received with the executed time information.

13 Claims, 7 Drawing Sheets

(56) References Cited

U.S. PATENT DOCUMENTS

| | | | |
|---|---|---|---|
| 2008/0251582 A1* | 10/2008 | Nguyen | G06Q 20/20 235/449 |
| 2009/0119362 A1* | 5/2009 | Moriya | G06F 17/30017 709/203 |
| 2009/0287576 A1* | 11/2009 | Suzuki | G06Q 20/20 705/16 |
| 2010/0090002 A1* | 4/2010 | Mochizuki | G06Q 10/00 235/383 |
| 2010/0325050 A1* | 12/2010 | Ito | B41M 5/00 705/50 |
| 2011/0028164 A1* | 2/2011 | Kato | H04W 8/08 455/456.1 |
| 2011/0055030 A1* | 3/2011 | Nicolas | G06Q 20/20 705/16 |
| 2012/0133595 A1* | 5/2012 | Lippolis | G06F 3/04883 345/173 |
| 2012/0133596 A1* | 5/2012 | Lippolis | G06F 3/04883 345/173 |
| 2012/0136737 A1* | 5/2012 | Lippolis | G06F 3/0485 705/23 |
| 2012/0254032 A1* | 10/2012 | Carbonell Duque | G06Q 20/3278 705/44 |
| 2012/0280030 A1* | 11/2012 | Hashimoto | G07G 1/0045 235/375 |
| 2013/0023247 A1* | 1/2013 | Bolon | H04W 24/08 455/414.1 |
| 2013/0218775 A1* | 8/2013 | Dabosville | G06Q 20/40 705/44 |
| 2014/0004922 A1* | 1/2014 | Behm | G07F 17/329 463/17 |
| 2014/0006189 A1* | 1/2014 | Takasu | G06Q 20/204 705/17 |
| 2015/0019976 A1* | 1/2015 | Lee | H04L 47/824 715/733 |
| 2015/0112879 A1* | 4/2015 | Ghosh | G06Q 50/16 705/313 |
| 2015/0138592 A1* | 5/2015 | Yokoyama | G07G 1/00 358/1.15 |
| 2015/0154634 A1* | 6/2015 | Chiu | G06Q 30/0253 705/14.51 |
| 2015/0186871 A1* | 7/2015 | Laracey | G06Q 20/3278 705/41 |
| 2015/0206111 A1* | 7/2015 | Sugiyama | G06Q 20/12 705/14.66 |
| 2015/0242963 A1* | 8/2015 | Schule | G06Q 40/12 705/30 |
| 2015/0287013 A1* | 10/2015 | Terashima | G06Q 20/209 705/24 |
| 2015/0310410 A1* | 10/2015 | Chai | G06Q 20/20 705/21 |
| 2015/0356537 A1* | 12/2015 | Yamada | G06Q 20/3274 705/21 |
| 2016/0042336 A1* | 2/2016 | Tajima | G06Q 20/202 705/21 |
| 2016/0117688 A1* | 4/2016 | Ghosh | G06Q 30/0201 705/7.29 |
| 2016/0212213 A1* | 7/2016 | Aoki | G06F 11/1402 |
| 2016/0212585 A1* | 7/2016 | DeCorte | H04W 4/021 |
| 2016/0212590 A1* | 7/2016 | DeCorte | H04W 4/028 |
| 2017/0068945 A1* | 3/2017 | Tsuchimochi | G07G 1/12 |
| 2017/0076306 A1* | 3/2017 | Snider | G06Q 30/0205 |
| 2017/0116552 A1* | 4/2017 | Deodhar | G06Q 10/06316 |
| 2017/0206593 A1* | 7/2017 | Zolotov | G06Q 30/0639 |

FOREIGN PATENT DOCUMENTS

| | | |
|---|---|---|
| CN | 103325038 A | 9/2013 |
| JP | 2014-085863 A | 5/2014 |

* cited by examiner

| | | | | | | |
|---|---|---|---|---|---|---|
| | TRANSACTION INFORMATION | TRANSACTION TIME INFORMATION (2014/1/1 11:45:00) | CHECKOUT COUNTER ID | | | R1 |
| | TRANSACTION INFORMATION | TRANSACTION TIME INFORMATION (2014/1/1 11:58:25) | CHECKOUT COUNTER ID | | | R2 |
| | TRANSACTION INFORMATION | TRANSACTION TIME INFORMATION (2014/1/1 12:00:41) | CHECKOUT COUNTER ID | | | R3 |
| | TRANSACTION INFORMATION | TRANSACTION TIME INFORMATION (2014/1/1 12:01:52) | CHECKOUT COUNTER ID | | | R4 |
| | TRANSACTION INFORMATION | TRANSACTION TIME INFORMATION (2014/1/1 12:04:40) | CHECKOUT COUNTER ID | | | R5 |
| | TRANSACTION INFORMATION | TRANSACTION TIME INFORMATION (2014/1/1 12:10:00) | CHECKOUT COUNTER ID | | | R6 |

(B) 62a

RELATED RECORD (A) 62b

| CUSTOMER ID | EXECUTED TIME INFORMATION (2014/1/1 12:00:00) | POSITIONING INFORMATION | EXECUTED MOVEMENT INFORMATION |
|---|---|---|---|

FIG. 6

TRANSACTION SYSTEM AND INFORMATION PROCESSING METHOD

Priority is claimed under 35 U.S.C. § 119 to Japanese Application nos. 2014-159222 filed Aug. 5, 2014 and 2015-91073 filed Apr. 28, 2015 are hereby incorporated by reference in their entirety.

BACKGROUND

1. Technical Field

The present disclosure relates to a transaction system and to an information processing method.

2. Related Art

Systems that relate identification information recorded on a member or customer loyalty card to specific information related to a transaction by reading the member card with a reading device are known from the literature. See, for example, JP-A-2014-85863.

To link identification information to transaction-related information in a system such as described above requires the system to have a specialized device, such as the reading device. This provides an opportunity to cut the cost of the system.

SUMMARY

The present disclosure is directed to this problem, and an objective of the disclosure is to enable relating identification information to transaction-related information without using a specialized or dedicated device.

A transaction system according to one aspect of the disclosure includes: a POS system that transmits transaction information, which is information related to a transaction, and the time a transaction is made, during a transaction; a terminal that detects if the terminal performed a specific movement, and transmits identification information and executed time information indicating when the specific movement was detected if the specific movement is detected; and a control device that, based on the transaction time information received from the POS system and the executed time information received from the terminal, relationally stores the transaction information received with the transaction time information and the identification information received with the executed time information.

Thus comprised identification information and transaction-related information can be linked without providing a dedicated device.

In a transaction system according to another aspect of the disclosure, the POS system preferably includes a POS terminal that transmits control data instructing executing a transaction-related process during a transaction, and a processing device that executes a process based on the received control data, and transmits the transaction information based on the control data and the transaction time information to the control device.

Thus comprised, the processing device receives control data from the POS terminal according to the transaction, and transaction information and transaction time information can therefore be sent from the POS system to the control device.

In a transaction system according to another aspect of the disclosure, the terminal acquires positioning information indicating the position of the terminal, and when the terminal detects a specific movement, sends the positioning information with the identification information and the executed time information to the control device; and the control device identifies the POS system located at the position corresponding to the location of the terminal based on the positioning information received from the terminal.

Thus comprised, the control device can identify the POS system where the customer made a transaction based on the positioning information sent by the terminal.

Further preferably, when the terminal detects a specific movement was performed, the terminal sends executed movement information identifying the specific movement with the identification information, the executed time information, and the positioning information to the control device. The control device also stores information identifying the POS system relationally to the executed movement information, and relationally stores the transaction information received with the transaction time information with the identification information received with the executed time information when the transaction time information received from the POS system matches the executed time information received from the terminal, and the specific movement identified by the executed movement information received with the executed time information matches the specific movement identified by the executed movement information stored relationally to information identifying the POS system identified based on the positioning information received with the executed time information.

Thus comprised, transaction information and identification information can be related when a customer completes a transaction at a POS system, and the customer performs a specific operation (movement) corresponding to the POS system with the terminal.

In a transaction system according to another aspect of the disclosure, the terminal determines the terminal performed the specific movement when the terminal is moved in a specific way.

Thus comprised, the customer can cause the control device to relate identification information and transaction by moving the terminal in a specific way according to the transaction.

In a transaction system according to another aspect of the disclosure, the terminal determines the terminal performed the specific movement when the terminal is positioned a specific way.

Thus comprised, the customer can cause the control device to relate identification information and transaction by placing the terminal in a specific position according to the transaction.

In a transaction system according to another aspect of the disclosure, the terminal determines the terminal performed the specific movement when the terminal is located in a specific area.

Thus comprised, the terminal can be prevented from running unnecessary processes.

In a transaction system according to another aspect of the disclosure, the terminal informs the user of the specific movement to perform.

Thus comprised, the user can know from the terminal what movement to perform with the terminal.

In a transaction system according to another aspect of the disclosure, the POS system informs the user of the specific movement the terminal must perform.

Thus comprised, the user can know from through the POS system what movement to make with the terminal.

Another aspect of the disclosure is an information processing method including: a POS system transmitting transaction information, which is information related to a transaction, and transaction time information indicating the time the transaction was made; a terminal detecting whether or not the terminal moved in a specific way, and when the terminal detects it moved in the specific way, transmitting identification information and executed time information indicating when the terminal made the specific movement; and a control device receiving the transaction information and the transaction time information transmitted by the POS system, receiving the identification information and executed time information transmitted from the terminal, and relationally storing the transaction information received with the transaction time information and the identification information received with the executed time information based on the received transaction time information and the received executed time information.

Thus comprised, identification information and transaction-related information can be linked without providing a dedicated device.

Another aspect of the disclosure is a transaction system including: a POS system that transmits transaction information, which is information related to a transaction, and the time a transaction is made, during a transaction; a terminal that transmits identification information and terminal state information identifying the state of the terminal; and a control device that detects if the terminal performed a specific movement based on the terminal state information received from the terminal, acquires executed time information indicating the time the specific movement of the terminal was detected if the terminal performed the specific movement, and relationally stores the transaction information received with the transaction time information and the identification information received with the terminal state information based on the transaction time information received from the POS system, and the executed time information acquired based on the terminal state information.

Thus comprised, identification information and transaction-related information can be linked without providing a dedicated device.

Preferably, the POS system also includes a POS terminal that transmits control data instructing executing a transaction-related process during a transaction, and a processing device that transmits the transaction information based on the control data and the transaction time information to the control device.

Thus comprised, transaction information and transaction time information can be sent from the POS system to the control device because the processing device receives control data from the POS terminal according to a transaction.

In a transaction system according to another aspect of the disclosure, the terminal acquires positioning information indicating the position of the terminal, and transmits the positioning information with the identification information and the terminal state information to the control device; and the control device identifies the POS system located at the position corresponding to the location of the terminal when the terminal performed the specific movement based on the positioning information received from the terminal.

Thus comprised, the control device can identify the POS system where the customer made a transaction based on the positioning information sent by the terminal.

Further preferably, the control device relationally stores information identifying the POS system and executed movement information identifying the specific movement, and relationally stores the transaction information received with the transaction time information and the identification information received with the executed time information when the transaction time information received from the POS system matches the executed time information acquired based on the terminal state information, and the specific movement detected based on the terminal state information matches the specific movement identified by the executed movement information stored relationally to information identifying the POS system.

Thus comprised, transaction information and identification information can be related when a customer completes a transaction at a POS system, and the customer performs a specific operation (movement) corresponding to the POS system with the terminal.

In a transaction system according to another aspect of the disclosure, the control device determines the terminal performed the specific movement when the terminal moved in a specific way.

Thus comprised, the customer can cause the control device to relate identification information and transaction by moving the terminal in a specific way according to the transaction.

In a transaction system according to another aspect of the disclosure, the control device determines the terminal performed the specific movement when the terminal is positioned a specific way.

Thus comprised, the customer can cause the control device to relate identification information and transaction by placing the terminal in a specific position according to the transaction.

In a transaction system according to another aspect of the disclosure, the terminal transmits the identification information and the terminal state information to the control device when the terminal is located in a specific area.

Thus comprised, the terminal can be prevented from running unnecessary processes.

In a transaction system according to another aspect of the disclosure, the terminal informs the user of the specific movement the terminal must perform.

Thus comprised, the user can know from through the terminal what movement to make with the terminal.

In a transaction system according to another aspect of the disclosure, the POS system informs the user of the specific movement the terminal must perform.

Thus comprised, the user can know from through the POS system what movement to make with the terminal.

Another aspect of the disclosure is an information processing method including: a POS system transmitting transaction information, which is information related to a transaction, and transaction time information indicating the time the transaction was made; a terminal transmitting identification information and terminal state information identifying the state of the terminal; and a control device receiving the transaction information and transaction time information transmitted by the POS system, receiving the identification information and the terminal state information transmitted by the terminal, detecting if the terminal performed a specific movement based on the received terminal state information, acquiring executed time information indicating the time when the terminal made the specific movement if the specific movement of the terminal is detected, and relationally storing the transaction information received with the transaction time information and the identification information received with the terminal state information based on the received transaction time information and the executed time information acquired based on the terminal state information.

Thus comprised, identification information and transaction-related information can be linked without providing a dedicated device.

Other objects and attainments together with a fuller understanding of the disclosure will become apparent and appreciated by referring to the following description and claims taken in conjunction with the accompanying drawings.

BRIEF DESCRIPTION OF THE DRAWINGS

FIG. 6 is used to describe the related record selection process.

DESCRIPTION OF EMBODIMENTS

Preferred embodiments of the present disclosure are described below with reference to the accompanying figures.

Embodiment 1

Figure 1:
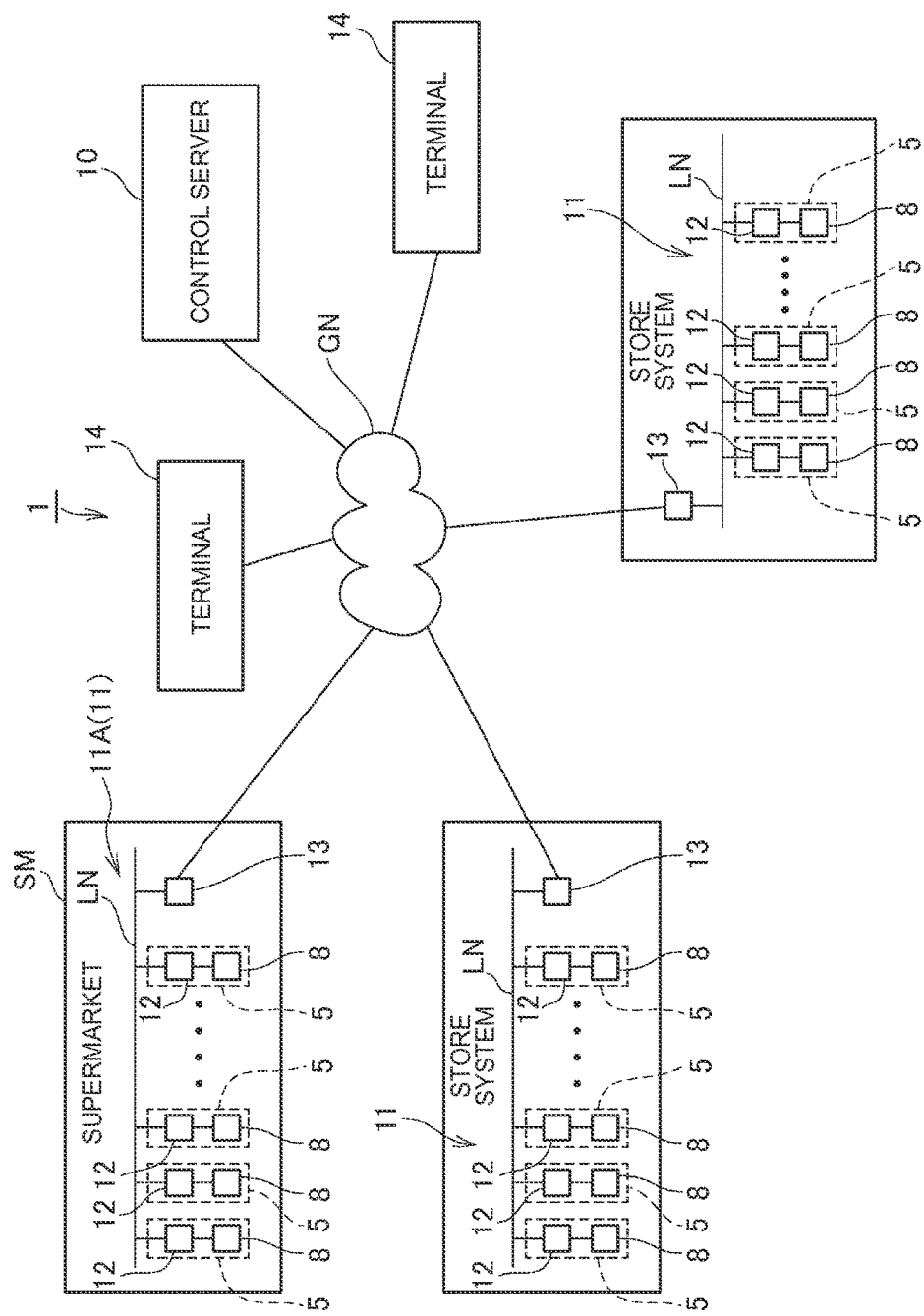
FIG. 1 illustrates the configuration of a transaction system according to a first embodiment of the disclosure.

FIG. 1 shows the configuration of a transaction system 1 according to a preferred embodiment of the disclosure.

As shown in FIG. 1, the transaction system 1 includes a control server 10 (control device). A plurality of store systems 11 connect to the control server 10 through the Internet or other network GN. The store system 11 is a system that is used in retail businesses such as supermarkets, convenience stores, department stores, and restaurants. The store system 11 has a function for producing receipts for customers of the business.

The store system 11 has one or more recording devices 12 (processing devices) for producing receipts. Each recording device 12 connects to a local area network LN deployed in the store. A network communication controller 13 including a communication device such as a network router or modem connects to the local area network LN. The recording device 12 accesses the network GN through the network communication controller 13.

A POS terminal 8 connects to the recording device 12 in the store system 11. A POS application and printer driver are installed on the POS terminal 8. As described below, the POS terminal 8 controls the recording device 12 and produces receipts with the recording device 12 by functions of a POS application and printer driver.

One or more checkout counters are located in the business. A recording device 12 and a POS terminal 8 connected to the recording device 12 are installed at each checkout counter. A checkout counter is where a sale transaction with a customer is processed. A checkout clerk works at each checkout counter, and the POS terminal 8 controls the recording device 12 and produces receipts based on instructions from the checkout clerk.

In this embodiment of the disclosure, a system comprising a recording device 12 and POS terminal 8 installed at a checkout counter is called a POS system 5. A POS system 5 including a recording device 12 and a POS terminal 8 is therefore installed at a checkout counter.

In the example shown in FIG. 1, the store system 11A is a system used in a supermarket SM. Plural checkout counters are set up in the supermarket SM. A recording device 12 and a POS terminal 8 are installed at each checkout counter. A customer purchasing a product in the supermarket SM completes a sale transaction at the checkout counter. The POS terminal 8 executes a payment process according to the transaction, and sends control data instructing producing a receipt to the recording device 12. Based on the received control data, the recording device 12 produces a receipt. The printed receipt is given to the customer.

As shown in FIG. 1, terminals 14 connect to the network GN. The terminal 14 is a tablet-like cell phone (a smartphone) owned by the customer. The terminal 14 simply needs to have the ability to execute the processes described below, and a tablet computer, for example, may be used as the terminal 14.

Figure 2:
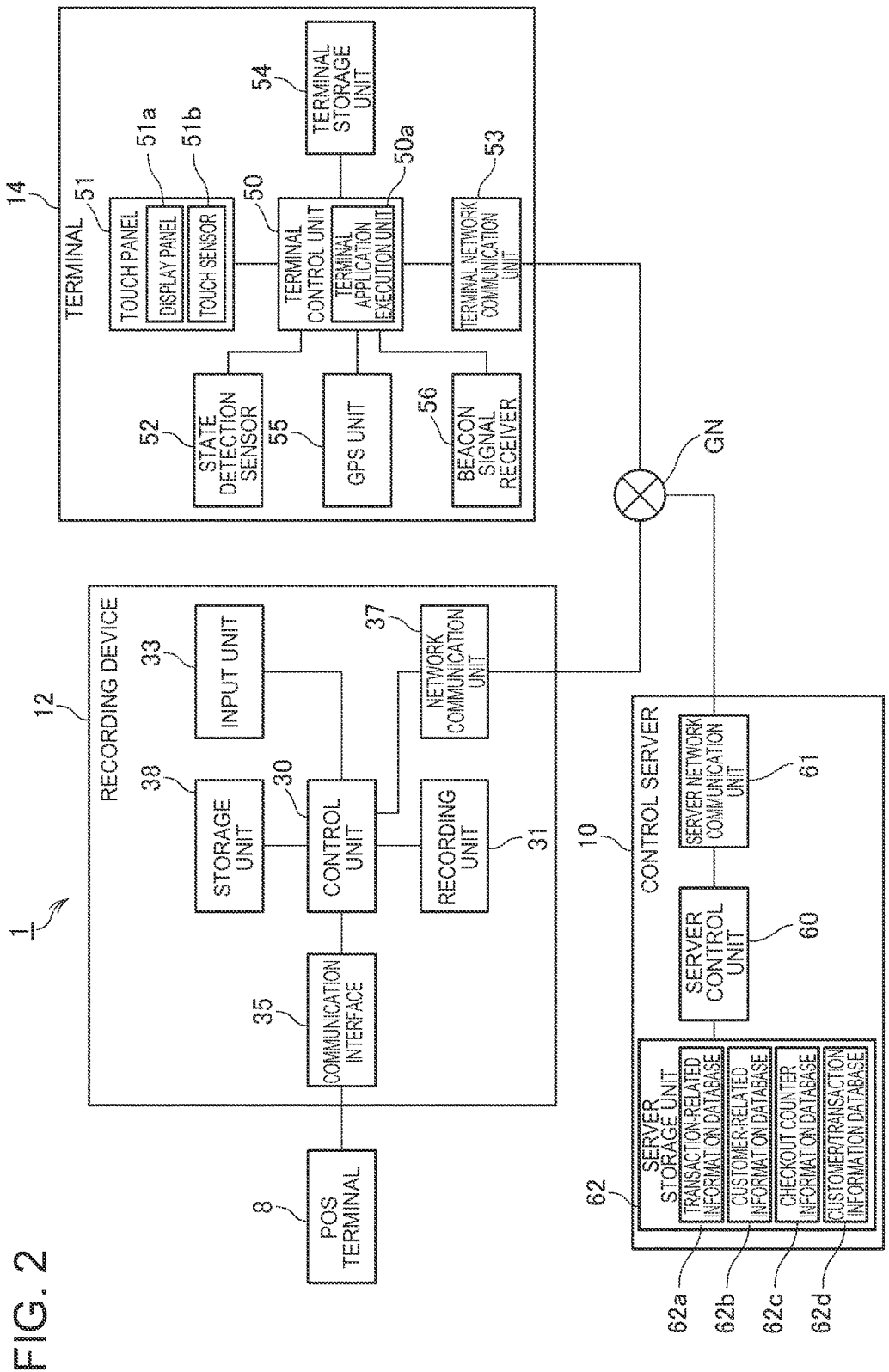
FIG. 2 is a block diagram illustrating the functional configuration of the transaction system.

FIG. 2 is a block diagram showing the functional configuration of the transaction system 1.

As shown in FIG. 2, the transaction system 1 includes a POS terminal 8, a recording device 12, a terminal 14, and a control server 10.

The recording device 12 is a thermal line printer that stores roll paper and records images by forming dots by a thermal line head on the roll paper.

As shown in FIG. 2, the recording device 12 includes a control unit 30, a recording unit 31, an input unit 33, a communication interface 35, a network communication unit 37, and a storage unit 38.

The control unit 30 includes a CPU, ROM, RAM, and controls the recording device 12. The control unit 30 controls the recording device 12 by reading and running firmware stored in ROM, for example.

The recording unit 31 includes a thermal head, a roll paper conveyance mechanism, a cutter unit for cutting the roll paper, and other mechanisms and devices related to recording on the roll paper, and forms dots and records on the roll paper as controlled by the control unit 30.

The input unit 33 includes operating switches disposed to the cabinet of the recording device 12, detects operation of the operating switches, and outputs to the control unit 30. Based on input from the input unit 33, the control unit 30 detects the operations corresponding to the operated switch, and runs a process appropriate to the operation.

The communication interface 35 communicates with the POS terminal 8 according to a specific communication protocol as controlled by the control unit 30.

The network communication unit 37 communicates with other devices (such as the control server 10) connected to the network GN through the network GN according to a specific communication protocol as controlled by the control unit 30.

The storage unit 38 includes nonvolatile memory, and stores data.

As shown in FIG. 2, the terminal 14 includes a terminal control unit 50, a touch panel 51, a state detection sensor 52, a terminal network communication unit 53, a terminal storage unit 54, a GPS unit 55, and a beacon signal receiver 56.

The terminal control unit 50 includes a CPU, ROM, RAM, and other peripheral circuits and controls the terminal 14.

The touch panel 51 includes a display panel 51a disposed to the front of the terminal 14, and a touch sensor 51b disposed over the display panel 51a. The display panel 51a is a display such as an LCD panel or OLED panel. The touch sensor 51b is a capacitive or pressure sensitive sensor, detects the operator's touch operations with a finger or stylus, and outputs to the terminal control unit 50.

The state detection sensor 52 includes at least one of an acceleration sensor, gyroscope sensor, and inclinometer. The state detection sensor 52 detects the acceleration, angular velocity, and inclination of the terminal 14 case at a regular interval, and output to the terminal control unit 50. As described further below, the terminal control unit 50 determines if the terminal 14 moved in a specific way based on input from the state detection sensor 52.

The terminal network communication unit 53 communicates with devices connected to the network GN (such as the control server 10) through the network GN according to a specific wireless communication protocol as controlled by the terminal control unit 50.

The terminal storage unit 54 includes nonvolatile memory and stores data.

The GPS unit 55 receives GPS satellite signals via a GPS antenna, and acquires information related to the location of the terminal 14 based on the GPS satellite signals and outputs to the terminal control unit 50. The terminal control unit 50 acquires positioning information, which is information identifying the location of the terminal 14, based on input from the GPS unit 55. In this embodiment of the disclosure the positioning information includes latitude and longitude information, and is information that can identify the position of the terminal 14.

The beacon signal receiver 56 receives a beacon signal by wireless communication and outputs information contained in the beacon signal to the terminal control unit 50. The terminal control unit 50 then executes a specific process described below based on input from the beacon signal receiver 56.

A specific application (referred to below as a terminal application AP) is preinstalled to the terminal 14. The terminal control unit 50 of the terminal 14 includes a terminal application execution unit 50a that executes processes by functions of the terminal application AP. A process executed by the terminal application execution unit 50a is described further below.

The control server 10 is a server device that connects to the network GN, and includes a server control unit 60, a server network communication unit 61, and a server storage unit 62.

The server control unit 60 includes CPU, ROM, RAM, and other peripheral circuits, and controls the control server 10.

The server network communication unit 61 communicates with devices connected to the network GN through the network GN according to a specific communication protocol as controlled by the server control unit 60.

The server storage unit 62 is nonvolatile memory and stores data.

As described above, the transaction system 1 produces paper receipts based on the transactions of customers of the business. A customer completing a transaction in this embodiment of the disclosure can also receive specific services based on the transaction from the control server 10.

These specific services include, for example, awarding points according to the total purchase amount of the transaction or the purchased products, and producing electronic receipts. Producing an electronic receipt herein means displaying all or part of the information recorded on the paper receipt produced by the POS system 5 on the customer's terminal 14 or other device in response to a customer request.

For a server device such as the control server 10 to provide customers with specific services based on the customer's transaction, information related to the customer transaction and identification information (below, the customer ID) identifying the customer must be relationally stored on the server.

Conventionally, the POS system 5 installed at a checkout counter has a reading device for reading a membership card recording a customer ID. During the transaction, the customer typically swipes the membership card through the reader, and the POS system 5 relationally sends the customer ID captured by the reader together with information related to the customer transaction to the server device. The server device then stores the information related to the customer transaction relationally to the customer ID based on the received information. The server device thus conventionally stores information related to the customer transaction relationally to the customer ID.

However, this method of the related art requires installing a reader at the POS system 5, creating an opportunity to reduce the cost.

The devices in the transaction system 1 according to the disclosure therefore execute the processes described below when a transaction is made at the checkout counter.

Figure 3:
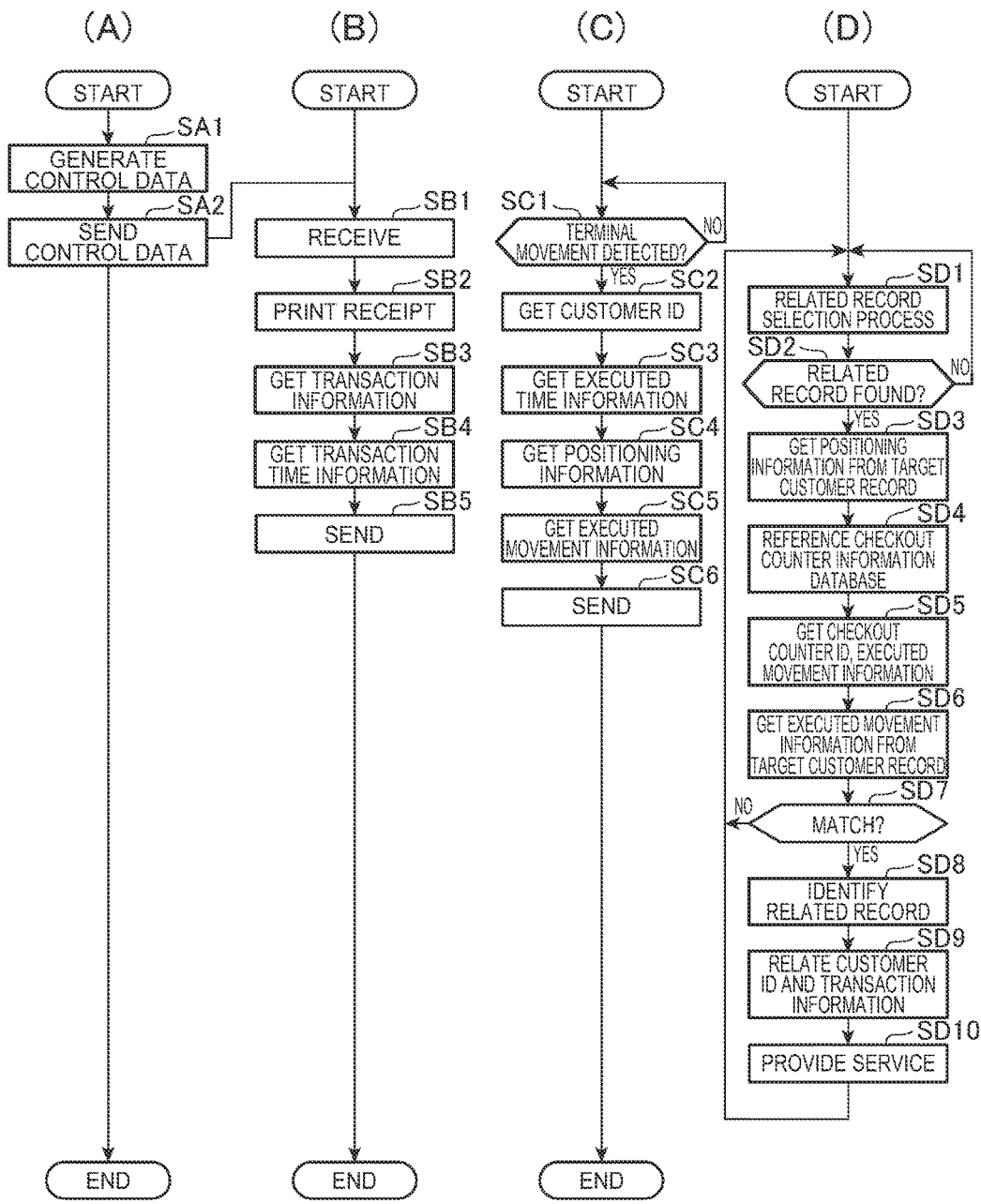
FIG. 3 is a flow chart of the operation of devices in the transaction system.

FIG. 3 is a flow chart of the operation of devices in the transaction system 1, (A) showing the operation of the POS terminal 8, (B) showing the operation of the recording device 12, (C) showing the operation of the terminal 14, and (D) showing the operation of the control server 10.

Transmitters that transmit beacon signals according to a specific protocol are installed at various places on the sales floor where the store system 11 is deployed. Each transmitter broadcasts a beacon signal at a specific period (such as every second). Multiple transmitters are placed around the sales floor so that the entire floor is covered by the beacon signals broadcast by the transmitters.

Identification information of the terminal application AP (referred to below as the application ID) is carried by the beacon signal broadcast by each transmitter.

When the beacon signal receiver 56 of the terminal 14 receives a beacon signal from a transmitter, the beacon signal receiver 56 outputs the application ID received in the beacon signal to the terminal control unit 50. When an application ID is input from the beacon signal receiver 56 while a specific application is not running, the terminal control unit 50 starts the specific application based on the application ID. The specific application can be started using a function of the operating system of the terminal 14.

While the application is running, the terminal application execution unit 50a monitors whether or not a beacon signal is not received for a continuous time exceeding a specific threshold based on input from the beacon signal receiver 56. By checking if the time that a beacon signal is not received continues for a specific time, the terminal application execution unit 50a can monitor whether or not the terminal 14 has moved off the sale floor.

If the time that a beacon signal is not received exceeds the specific threshold, the terminal application execution unit 50a aborts the application.

As a result, the application runs while the terminal 14 is on the sale floor. The terminal 14 therefore executes the process shown in FIG. 3 (C) while the terminal 14 is on the sale floor (while the customer is on a sale floor in the business).

As shown in FIG. 3 (A), the POS terminal 8 executes a payment process appropriately to the customer transaction, and generates control data based on the payment process (step SA1).

More specifically, the function blocks of the POS terminal 8 include a POS application execution unit that runs a POS application, and a printer driver execution unit that runs a printer driver.

The POS application execution unit generates receipt information including the information to print on a receipt according to the customer transaction. The receipt information is information including, for example, information related to a logo printed on the receipt; when the receipt is printed (date and time); information related to the names, prices, quantities, and applicable tax for the products the customer purchased; the purchase total; the amount received from the customer; the amount of change due; or other information. While not shown in the figures, a barcode reader that read barcodes from products or product packaging is connected to the POS terminal 8. When processing a transaction for a customer of the business, the POS application execution unit gets required information from product master and customer master databases by specific means as needed and generates the receipt information based on input from the barcode reader or input by the checkout clerk through a keypad or other input means.

After generating the receipt information, the printer driver execution unit generates control data, which is control data based on the command language of the recording device 12, instructing printing the receipt information.

Next, the POS terminal 8 sends the generated control data to the recording device 12 (step SA2).

As shown in FIG. 3 (B), the control unit 30 of the recording device 12 controls the communication interface 35 to receive the control data (step SB1).

Next, the control unit 30 controls the recording unit 31 based on the control data to record the receipt information on the roll paper and produce a receipt (step SB2). The checkout clerk then gives the printed receipt to the customer.

Next, the control unit 30 acquires the transaction information based on the receipt information (step SB3). The transaction information is information related to the transaction extracted from the receipt information, and may include, for example, when the receipt was printed (date and time); information related to the names, prices, quantities, and applicable tax for the products the customer purchased; the purchase total; the amount received from the customer; the amount of change due; or other information.

Next, the control unit 30 gets the transaction time information (step SB4). The transaction time information is information identifying the time of the transaction. In this embodiment of the disclosure, the time indicated by the information contained in the receipt information indicating when the receipt was produced is the time of the transaction. The time the transaction was completed is not limited to the time the receipt was produced, and may be the time the process of step SB4 was executed, or the time control data was received from the POS terminal 8, for example. More specifically, the time the transaction was completed is a time value related to the transaction.

Next, the control unit 30 controls the network communication unit 37 to send the transaction information acquired in step SB3, the transaction time information acquired in step SB4, and the checkout register ID to the control server 10 (step SB5).

The checkout register ID is identification information identifying a particular checkout register (checkout counter), and is uniquely assigned to each register (checkout counter). The control unit 30 manages the checkout register ID of the checkout counter where the recording device 12 is installed. Because a POS system 5 is installed at the checkout counter in this embodiment of the disclosure, the checkout register ID is also information identifying a POS system 5.

The control unit 30 manages the information required for communication with the control server 10, such as the address of the control server 10. In step SB5, the control unit 30 establishes a connection with the control server 10 according to a specific communication protocol based on the managed information, and sends the information through the opened connection.

While not shown in FIG. 3, the control server 10 executes the following process when transaction information and transaction time information is sent from the recording device 12.

The server control unit 60 of the control server 10 controls the server network communication unit 61 to receive the transaction information, transaction time information, and checkout register ID.

Next, the server control unit 60 accesses a transaction-related information database 62*a* stored by the server storage unit 62.

Figure 4:
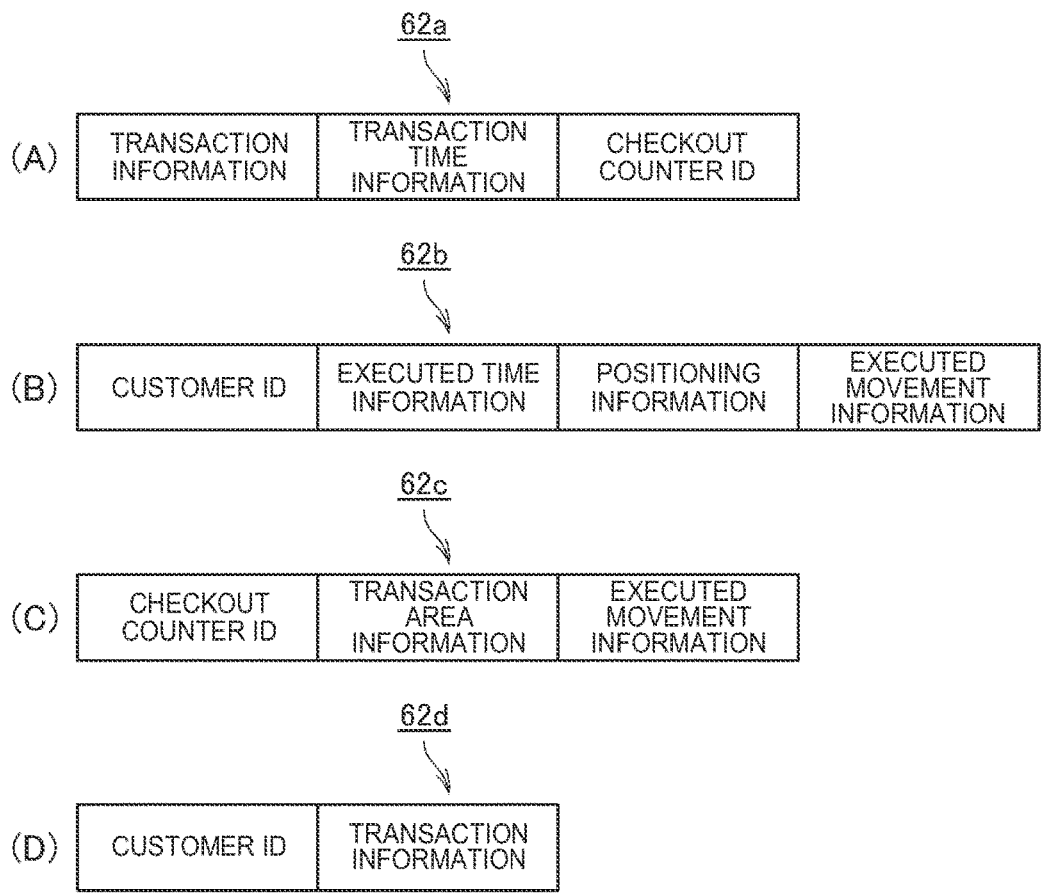
FIG. 4 illustrates the data structure of a database stored by the control server.

FIG. 4 (A) shows an example of the data structure of one record in the transaction-related information database 62*a*.

As shown in FIG. 4 (A), one record of the transaction-related information database 62*a* relationally stores the transaction information, transaction time information, and checkout register ID.

Next, the server control unit 60 creates a record relationally storing the transaction information, transaction time information, and checkout register ID in the transaction-related information database 62*a*.

As a result of this process, a record relationally storing the transaction information, transaction time information, and checkout register ID is created according to the transaction completed at the POS system 5 in the transaction-related information database 62*a* of the control server 10.

When the customer making a transaction at the checkout counter desires to receive a particular service from the control server 10 based on the transaction (in this embodiment, a service awarding points based on the transaction), the customer moves the terminal 14 a specific way during the transaction. Note that this specific movement of the terminal 14 means a physical movement of the terminal 14 case, and does not mean a software process. This concept of terminal 14 movement includes the terminal 14 being at rest in a specific position.

The movement that must be performed with the terminal 14 by a customer wishing to receive the transaction-related service is different at each checkout counter. How the terminal 14 must be moved when a transaction-related service is desired, and that the terminal 14 must be moved in a specific way during the transaction is reported by a specific method to the customer before or during the transaction.

For example, the terminal application execution unit 50*a* may query the control server 10 for how to move the terminal 14 (executed movement information) to receive the transaction-related service at each checkout counter. The executed movement information for each checkout counter is stored in a checkout counter information database 62*c* stored by the server storage unit 62 of the control server 10. Next, the terminal application execution unit 50*a* receives the executed movement information for each checkout counter from the control server 10. The terminal application execution unit 50*a* then displays a map of the sales floor where the customer is, and displays the location of each checkout counter and the executed movement information on the map on the display panel 51a. This enables the customer to know the specific movement to perform before starting the transaction.

The terminal application execution unit 50a may also query the control server 10 for the executed movement information appropriate to the checkout counter where the terminal 14 is located. The terminal application execution unit 50a then receives the executed movement information for the checkout counter where the terminal 14 is located from the control server 10, and displays the information on the display panel 51a. This enables the customer to know the specific movement to perform during the transaction.

The POS terminal 8 may also query the control server 10 through the recording device 12 for the executed movement information appropriate to the checkout counter where the POS terminal 8 is located. In this event, the POS terminal 8 then receives the executed movement information for the checkout counter where the POS terminal 8 is located from the control server 10 through the recording device 12, and displays the information on a customer display or other display unit not shown. This method also enables the customer to know the specific movement to perform during the transaction.

Further alternatively, audible prompts instead of a visual display may be used to teach the executed movement information, or a combination of audio and visual prompts may be used to teach the executed movement information.

Below, this movement of the terminal 14 is referred to as a "terminal movement." This concept of a terminal movement also includes the terminal 14 remaining at rest in a specific position as described above.

An example of a terminal movement is the movement of the terminal 14 produced when the customer waves the terminal 14. In this example, the terminal 14 moves in one direction, then moves in the opposite direction as the one direction, repeatedly within a short period of time.

Another example of the terminal movement is the movement of the terminal 14 when the customer moves the terminal 14 through an arc. In this event, the terminal 14 moves continuously along the curve.

Yet another example of the terminal movement is the movement of the terminal 14 when the customer moves the terminal 14 as though drawing a rectangle. In this event, the terminal 14 moves in a straight line and then pauses, then moves in a straight line perpendicular to the direction of travel before pausing, and these movements repeat.

Yet another example of the terminal movement is the terminal 14 remaining at rest in a specific position for a specific time as described further below.

Figure 5:
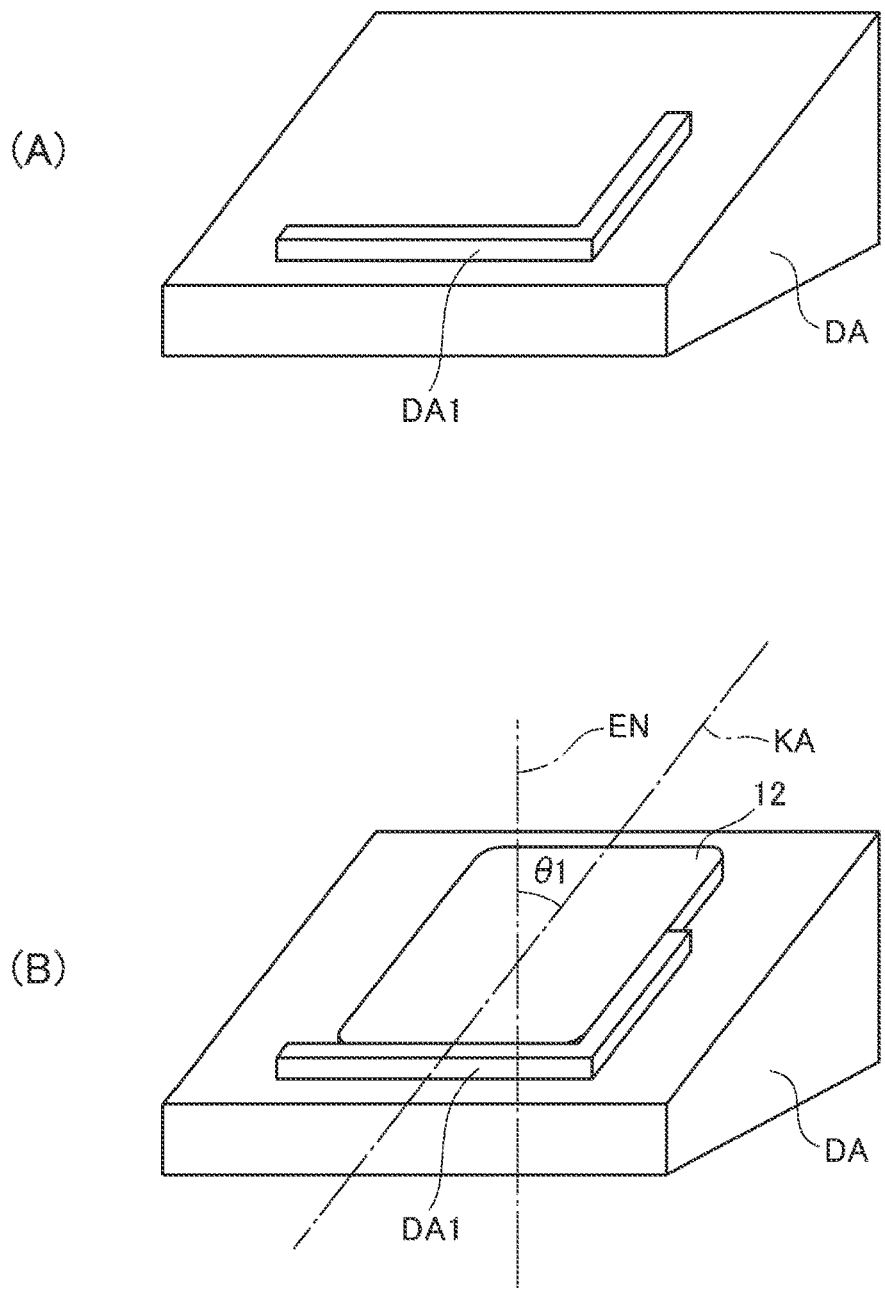
FIG. 5 shows an example of a terminal stand.

FIG. 5 (A) shows an example of a terminal stand DA installed at a checkout counter.

A terminal stand DA such as shown in FIG. 5 (A) is installed at a specific checkout counter. The terminal stand DA has an L-shaped support frame DA1. as shown in FIG. 5 (B), the position of the terminal 14 on the terminal stand DA is fixed by placing the terminal 14 on the terminal stand DA with the bottom and right sides of the terminal 14 against the support frame DA1.

When placed on the terminal stand DA, the angle $\theta 1$ between an imaginary line KA along the surface of the terminal 14 and the plumb line EN extending on the vertical is a specific angle corresponding to the slope of the terminal stand DA as shown in FIG. 5 (B).

That the terminal 14 is resting in a specific position for a specific time means that the terminal 14 is held continuously at this specific angle $\theta 1$ for a specific time. The value of this angle $\theta 1$ of the terminal movement is preset, and the slope of the terminal stand DA is designed according to the set angle $\theta 1$. The content of the terminal movement can therefore be changed appropriately to a particular checkout counter by changing the slope of the terminal stand DA and setting the value of the angle $\theta 1$ used for the terminal movement to the slope of the terminal stand DA at a particular checkout counter.

When the customer wishes to receive a transaction-related service in this event, the terminal movement of the terminal 14 can be easily accomplished by simply placing the terminal 14 on the terminal stand DA at the checkout counter where the customer is doing the transaction.

It will be obvious to one with ordinary skill in the related art that while plural terminal movements are described above, terminal movements are not limited to the above examples.

As shown in FIG. 3 (C), the terminal application execution unit 50a of the terminal control unit 50 of the terminal 14 monitors if the terminal movement was performed (step SC1). Multiple terminal movements are previously registered in the terminal 14, and information indicating the operation performed in the terminal movement is relationally stored to the registered terminal movements. In step SC1, the terminal application execution unit 50a uses a known technology such as pattern matching based on input from the state detection sensor 52 to detect which of the registered terminal movements is performed.

For example, if one terminal movement is that the terminal 14 remain for 5 seconds with angle $\theta 1$ equal to a value AT1, the terminal application execution unit 50a checks based on input from the state detection sensor 52 if the value of angle $\theta 1$ is AT1. Note that the value of AT1 is set with a specific tolerance range to accommodate detection error and variation in the design (manufacture or installation) of the terminal stand DA. When the value of angle $\theta 1$ goes to AT1, the terminal application execution unit 50a monitors whether or not angle $\theta 1$ remains AT1 for 5 seconds. If it does, the terminal application execution unit 50a determines one of the terminal movements was performed.

When a terminal movement is confirmed (step SC1 returns YES), the terminal application execution unit 50a gets the customer ID (identification information) (step SC2). The customer ID is previously assigned and the terminal application execution unit 50a manages the customer IDs.

The terminal application execution unit 50a then gets the executed time information (step SC3). The executed time information is information indicating the time that terminal movement detected in step SC1 was performed.

Based on input from the GPS unit 55, the terminal application execution unit 50a gets positioning information identifying the location of the terminal 14 (step SC4). The location identified by the positioning information acquired in step SC4 is the location of the customer making the transaction at the checkout counter.

Next, the terminal application execution unit 50a gets the executed movement information (step SC5). The executed movement information is identification information for the terminal movement identified in step SC1. The executed movement information is previously assigned for each registered terminal movement.

Next, the terminal application execution unit 50a controls the terminal network communication unit 53, and sends the customer ID acquired in step SC2, the executed time information acquired in step SC3, the location information acquired in step SC4, and the executed movement information acquired in step SC5 to the control server 10 as movement-related information related to movement of the terminal 14 (step SC6).

The terminal application execution unit 50a manages information required for communication with the control server 10, such as the address of the control server 10. In step SC6, the terminal application execution unit 50a establishes a connection according to a specific communication protocol with the control server 10 based on the managed information, and sends the information through the opened connection.

While not shown in FIG. 3, the control server 10 executes the following process when the customer ID, executed time information, positioning information, and executed movement information are sent from the terminal 14.

The server control unit 60 of the control server 10 controls the server network communication unit 61 to receive the customer ID, executed time information, positioning information, and executed movement information.

Next, the server control unit 60 accesses a customer-related information database 62b stored by the server storage unit 62.

FIG. 4 (B) shows an example of the data structure of one record in the customer-related information database 62b.

As shown in FIG. 4 (B), one record of the customer-related information database 62b relationally stores the customer ID, executed time information, positioning information, and executed movement information.

Next, the server control unit 60 creates a record relationally storing the received customer ID, executed time information, positioning information, and executed movement information in the customer-related information database 62b.

As a result of this process, a record relationally storing the customer ID, executed time information, positioning information, and executed movement information is created according to the terminal movement of the terminal 14 in the customer-related information database 62b of the control server 10.

In this example, the transaction time information, transaction information, and checkout counter ID sent by the recording device 12 in step SB5 are collectively referred to as transaction-related information.

The identification information, executed time information, positioning information, and executed movement information sent by the terminal 14 in step SC6 are collectively referred to as the customer-related information.

As shown in FIG. 3 (D), the server control unit 60 of the control server 10 executes a related record selection process (step SD1).

This related record selection process is described next.

In the related record selection process, the server control unit 60 determines if there is a related record in the transaction-related information database 62a when a new record is created in the customer-related information database 62b, and if there is a related record, selects the related record. The new record created in the customer-related information database 62b is referred to below as the "target customer record."

The record in the transaction-related information database 62a corresponding to the target customer record is a record in which the transaction time information in the record matches the executed time information in the target customer record. That the transaction time information and the executed time information match means that the difference between the time indicated by the transaction time information and the time indicated by the executed time information is less than a specific threshold. More specifically, if the time indicated by the transaction time information and the time indicated by the executed time information are close together, the transaction time information and the executed time information match.

For example, if the specific threshold is 5 minutes, the transaction time information matching the executed time information is transaction time information indicating a time within 5 minutes before or after the time indicated by the executed time information.

A customer wishing to receive a particular service performs the terminal movement with the terminal 14 during the transaction. Therefore, the time of the transaction performed by the customer, and the time the customer performs the terminal movement at the checkout counter, are close together in time. The likelihood that the target customer record and a record in the transaction-related information database 62a matching the target customer record were created based on transactions by the same customer is therefore high.

The related record selection process is described below with reference to FIG. 6. The specific threshold in the description using FIG. 6 is 5 minutes.

FIG. 6 (A) shows an example of the customer-related information database 62b containing a target customer record in which the executed time information is 2014/1/1/ 12:00:00.

FIG. 6 (B) shows an example of a transaction-related information database 62a containing plural records. More specifically, the transaction-related information database 62a has a record R1 in which the time indicated by the transaction time information is 2014/1/1/11:45:00. The transaction-related information database 62a also a record R2 in which the time indicated by the transaction time information is 2014/1/1/11:58:25. The transaction-related information database 62a also a record R3 in which the time indicated by the transaction time information is 2014/1/1/ 12:00:41. The transaction-related information database 62a also a record R4 in which the time indicated by the transaction time information is 2014/1/1/12:01:52. The transaction-related information database 62a also a record R5 in which the time indicated by the transaction time information is 2014/1/1/12:04:40. The transaction-related information database 62a also a record R6 in which the time indicated by the transaction time information is 2014/1/1/12:10:00.

In the related record selection process using the example shown in FIG. 6, the server control unit 60 identifies records R2 to R5 in which the time indicated by the transaction time information is within 5 minutes of the time indicated by the executed time information as records in the transaction-related information database 62a matching the target customer record.

Note that the server control unit 60 must monitor the records in the transaction-related information database 62a for at least as long as the time of the specific threshold (5 minutes in this example) after the target customer record is created.

Plural records matching the target customer record may be identified by the related record selection process in the following cases.

Specifically, when the customer completes a transaction and performs the terminal movement with the terminal 14 at one checkout counter, and then completes another transaction within a specific time at a different checkout counter (including at a checkout counter in a store other than the first store the customer visited).

As shown in FIG. 3 (D), while running the related record selection process, the server control unit 60 determines if a record matching the target customer record was found by the related record selection process (step SD2).

Below, the record in the transaction-related information database 62*a* matching the target customer record is referred to as the matching record. As described above, there may be plural matching records.

When a record matching the target customer record is found (step SD2 returns YES), the server control unit 60 gets the positioning information from the target customer record (step SD3).

The server control unit 60 then references a checkout counter information database 62*c* stored by the server storage unit 62 (step SD4).

FIG. 4 (C) shows an example of the data structure of one record in the checkout counter information database 62*c*.

As shown in FIG. 4 (C), one record of the checkout counter information database 62*c* stores a checkout register ID, transaction area information, and executed movement information.

The checkout counter ID is identification information for a particular checkout counter, and a unique value is assigned to each checkout counter.

The transaction area information identifies the area where the customer is when processing a transaction at a checkout counter. The area where the customer may be during the transaction is preset for each checkout counter according to the arrangement of the checkout counter, for example. The transaction area information is information enabling determining if the location identified by the positioning information described above is in the area identified by the transaction area information.

As described above, the executed movement information is identification information for a terminal movement and is previously assigned to each terminal movement.

Each record in the checkout counter information database 62*c* relationally stores for one checkout counter: the checkout counter ID assigned to the one checkout counter, transaction area information identifying the area where the customer is during a transaction at the one checkout counter, and executed movement information indicating the identification information of the terminal movement the customer performs with the terminal 14 when the customer making the transaction at the checkout counter wishes to receive the service.

The server control unit 60 then identifies the following records based on the positioning information acquired in step SD3, and the transaction area information in the records of the checkout counter information database 62*c*. Of the records in the checkout counter information database 62*c*, the server control unit 60 finds a record with transaction area information indicating the location including the position identified by the positioning information. The server control unit 60 then gets the checkout counter ID and the executed movement information from the identified record (step SD5).

The checkout counter of the checkout counter ID acquired by the server control unit 60 in step SD5 is the checkout counter where the customer made the transaction. By identifying the checkout counter where the customer made the transaction in step SD5, the POS system 5 at that checkout counter is identified.

The executed movement information acquired by the server control unit 60 in step SD5 is the identification information of the terminal movement set for the checkout counter where the customer made the transaction.

Next, the server control unit 60 references the target customer record in the customer-related information database 62*b*, and gets the executed movement information (step SD6).

Next, the server control unit 60 determines if the executed movement information acquired in step SD5 and the executed movement information acquired in step SD6 match (step SD7).

There will not be a match if customer accidentally performs a terminal movement with the terminal 14 in the area identified by the transaction area information for the one checkout counter that is different from the terminal movement set for that checkout counter. In this event, the terminal 14 sends the customer-related information and the control server 10 generates a target customer record based on the received customer-related information. Next, the server control unit 60 determines there is no match in step SD7.

There will be a match if the customer performs the terminal movement with the terminal 14 that is set for the checkout counter in the area identified by the transaction area information for that checkout counter.

If there is not a match (step SD7 returns NO), the server control unit 60 returns to step SD1. In this event, the transaction information described below is not related to a customer ID.

If there is a match (step SD7 returns YES), the server control unit 60 selects the matching record containing the checkout counter ID acquired in step SD5 from among the matching records identified by the related record selection process in step SD1 (step SD8).

The matching record with the checkout counter ID acquired in step SD5 is the record created based on the transaction-related information that was sent based on the customer transaction by the recording device 12 disposed to the checkout counter where the customer that performed the terminal movement made the transaction.

There may be plural matching records containing the checkout counter ID obtained in step SD5. This may occur when multiple transactions are completed consecutively at the checkout counter, and the customer performs the terminal movement with the terminal 14 in each transaction. In this event, the server control unit 60 identifies the matching record with transaction time information indicating a time closest chronologically to the time indicated by the executed time information in the target customer record.

Next, the server control unit 60 creates one record in the customer/transaction information database 62*d* stored by the server storage unit 62, and relationally stores in the created record the customer ID from the target customer record, and the transaction information from the matching record identified in step SD8 (step SD9).

FIG. 4 (D) shows an example of the data structure of one record in the customer/transaction information database 62*d*.

As shown in FIG. 4 (D), one record of the customer/transaction information database 62*d* stores the customer ID and transaction information.

Each record in the customer/transaction information database 62*d* relationally stores for a customer making a transaction at a checkout counter the customer ID of the customer and transaction information related to the transaction completed by the customer.

Next, the server control unit 60 provides a service to the customer based on the record created in the customer/transaction information database 62*d* in step SD9.

In this example, the service is awarding points. An example of a process for awarding points is described below.

The server control unit 60 stores a database relationally storing a customer ID with the balance of points owned by the customer. How many points are awarded is previously set according to the total purchase amount of the transaction. Based on the transaction information, the server control unit 60 gets the total purchase amount of the transaction and determines how many points to award based on the acquired total purchase amount. Next, the server control unit 60 accesses the database, finds the matching record using the customer ID as the search key, and increases the balance of points in the identified record according to the number of points awarded.

Note that the service provided by the control server 10 is not limited to this example. Because the customer ID and transaction information are relationally stored in step SD9, this information can be used to provide various services. For example, in addition to issuing an electronic receipt as described above, coupons may be issued or advertising or product information may be provided according to the products purchased in the transaction.

Furthermore, because the customer ID and transaction information are relationally stored in step SD9, transactions can be analyzed by individual customers, and services based on the result of the analysis can be provided.

As described above, a transaction system 1 according to this embodiment has a POS system 5 that executes transaction-related processes, a control server 10 (control device) that communicates with the POS system 5, and a terminal 14 that communicates with the control server 10.

During a transaction, the POS system 5 sends transaction information, which is information related to the transaction, and transaction time information indicating the time of the transaction, to the control server 10. The terminal 14 detects whether or not the terminal 14 was moved in a specific way, and if a specific movement of the terminal 14 is detected, the terminal 14 sends the customer ID (identification information) and executed time information indicating the time the terminal 14 moved in the specific way to the control server 10.

Based on the transaction time information received from the POS system 5 and the executed time information received from the terminal 14, the control server 10 determines if the information is related. If the information is related, the control server 10 relationally stores the transaction information received with the transaction time information, and the customer ID received with the executed time information.

Thus comprised the control server 10 can relationally store customer IDs and transaction information without adding a specialized reading device to the POS system 5. The cost can therefore be reduced.

In this embodiment of the disclosure the POS system 5 includes a POS terminal 8, and a recording device 12 (processing device) that produces a receipt as a process related to the transaction as controlled by the POS terminal 8.

During the transaction, the POS terminal 8 sends configuration data instructing executing a process related to the transaction to the recording device 12, and the recording device 12 produces a receipt based on the control data and sends the transaction information based on the control data and transaction time information to the control server 10.

Thus comprised when the recording device 12 prints a receipt, and when the recording device 12 receives control data from the POS terminal 8 to print a receipt, transaction information and transaction time information can be sent from the POS system 5 to the control server 10.

In this embodiment of the disclosure, the terminal 14 has a function for acquiring positioning information identifying the location of the terminal 14, and sends positioning information together with the identification information and executed time information to the control server 10 when movement of the terminal 14 in a specific way is detected.

Based on the positioning information received from the terminal 14, the control server 10 identifies the checkout counter (POS system 5) located in a position corresponding to the location of the terminal.

Thus comprised the control server 10 can identify the checkout counter (POS system 5) where the customer made a transaction based on the positioning information sent by the terminal 14.

When movement of the terminal 14 in a specific way is detected in this embodiment of the disclosure, the terminal 14 sends executed movement information identifying the specific movement that was performed together with identification information, executed time information, and positioning information to the control server 10.

The control server 10 relationally stores the checkout counter ID (information identifying a POS system 5) to executed movement information, and the control server 10 relationally stores the transaction information received with the transaction time information with the customer ID (identification information) received with the executed time information when the transaction time information received from the POS system 5 and the executed time information received from the terminal 14 match, and the specific movement identified by the executed movement information received with the executed time information matches the specific movement identified by the executed movement information stored relationally to the checkout counter ID identified based on the positioning information received with the executed time information.

Thus comprised transaction and a customer ID are relationally stored when the customer completes a transaction at a checkout counter and the customer moves the terminal 14 according to the terminal movement defined for that checkout counter.

Note that examples of a terminal movement in this embodiment of the disclosure are examples of the terminal 14 moving in a specific way.

Thus comprised, the customer can receive a specific service based on a transaction by moving the terminal 14 in specific way and causing the control server 10 to relate the customer ID and transaction information.

Another example of a terminal movement in this embodiment is the terminal 14 being positioned in a specific way.

Thus comprised, the customer can receive a specific service based on a transaction by placing the terminal 14 in specific position and causing the control server 10 to relate the customer ID and transaction information. More specifically, in this embodiment, the terminal 14 can be placed in the specific position by simply placing the terminal 14 on a terminal stand DA.

The terminal 14 in this embodiment also detects if the terminal 14 moved a specific way while the terminal 14 is located on the sales floor (in a specific area).

Thus comprised, the terminal 14 can be prevented from executing unnecessary processes when the terminal 14 is not on the sales floor.

Embodiment 2

A second embodiment of the disclosure is described next.

Figure 7:
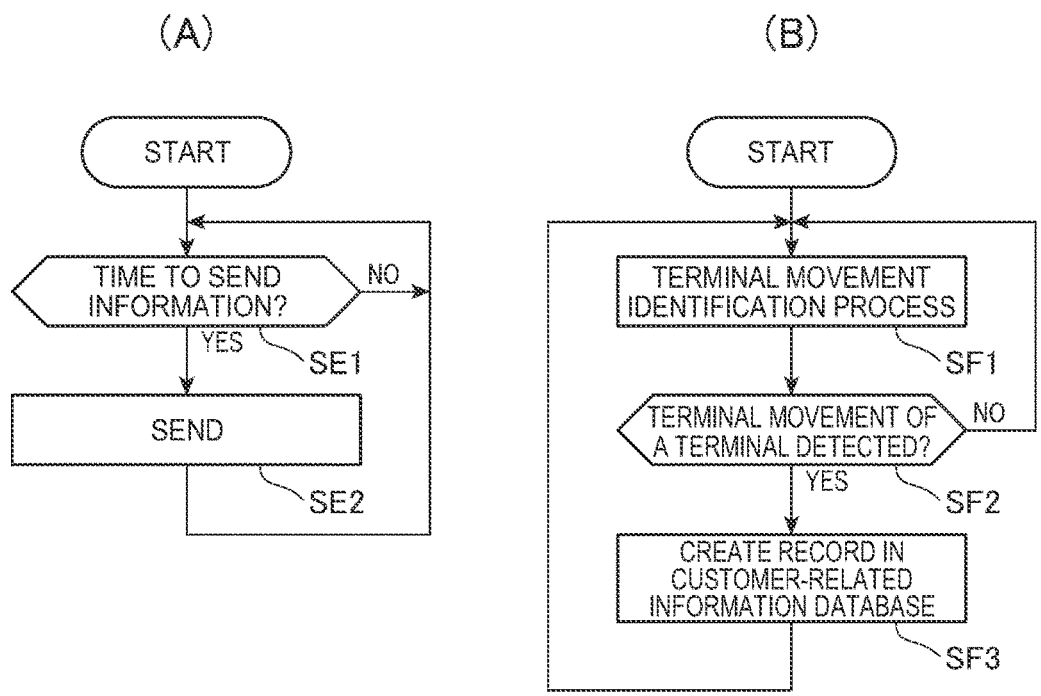
FIG. 7 is a flowchart of the operation of a terminal and control server according to a second embodiment of the disclosure.

FIG. 7 is a flow chart of the operation of the terminal 14 and control server 10 in a second embodiment of the disclosure, (A) showing the operation of the terminal 14, and (B) showing the operation of the control server 10.

The operation of the POS terminal 8 and the recording device 12 in the second embodiment are the same as in the first embodiment. The operation of the terminal 14 and the control server 10 differ from in the first embodiment. Note that as in the first embodiment, the control server 10 executes the steps in FIG. 3 (D). The control server 10 executes the steps in the flow chart in FIG. 7 (B) instead of the steps shown in FIG. 3 (D).

The operation of the terminal 14 and control server 10 in the second embodiment of the disclosure is described next with reference to FIG. 7.

The terminal 14 according to the second embodiment of the disclosure sends terminal state information, customer ID, and positioning information to the control server 10 at a specific interval (such as every 0.1 second). The terminal state information is the detection value from the acceleration sensor, gyroscope sensor, and inclinometer input from the state detection sensor 52. The period of input from the sensors and the period information is sent to the control server 10 are synchronized.

More specifically, as shown in FIG. 7 (A), the terminal application execution unit 50*a* of the terminal control unit 50 of the terminal 14 monitors if it is time to send information to the control server 10 (step SE1). The timing for sending information occurs at the specific interval.

When it is time to send information, the terminal application execution unit 50*a* gets the terminal state information, customer ID, and positioning information, and controls the terminal network communication unit 53 to send the acquired information to the control server 10 as operation-related information of the terminal 14.

Note that as in the first embodiment, the terminal 14 uses a beacon signal transmitted from a transmitter in a business to execute the process shown in the flow chart in FIG. 7 only when the terminal 14 is on a sale floor in the business.

As shown in FIG. 7 (B), the server control unit 60 of the control server 10 executes a terminal movement identification process (step SF1).

More specifically, the server control unit 60 receives the terminal state information, customer ID, and positioning information sent by the terminal 14 at a specific interval, and cumulatively stores the received information in a specific storage area. When information is received from plural terminals 14, the server control unit 60 differentiates and stores the information by customer ID.

Next, based on information cumulatively stored in the specific storage area, the server control unit 60 determines which of the terminals 14 that sent information is the terminal 14 that moved according to a registered terminal movement.

While running the terminal movement identification process, the server control unit 60 determines by the process if a terminal 14 moved according to a registered terminal movement (step SF2).

If there is a terminal 14 that moved according to a registered terminal movement (step SF2 returns YES), the server control unit 60 creates a record in the customer-related information database 62*b*, relationally stores the customer ID, executed time information, positioning information, and executed movement information in the created record, and then returns to step SF1.

The server control unit 60 acquires the customer ID and positioning information based on the information received from the terminal 14. The server control unit 60 acquires the executed time information based on the time it was determined in the terminal movement identification process that the terminal movement was performed by the terminal 14. The server control unit 60 also relationally manages information identifying the terminal movements with the executed movement information (information identifying a terminal movement), and gets the executed movement information based on the managed information.

If a terminal movement of the terminal 14 is detected by the process shown in the flow chart in FIG. 7 (B), a corresponding record is created in the customer-related information database 62*b*. The server control unit 60 processes the new record created in the customer-related information database 62*b* as the target customer record in the process shown in the flow chart of FIG. 3 (D), and relationally stores the transaction information and customer information if a specific condition is met.

The same effect as described in the first embodiment is achieved by the terminal 14 and control server 10 executing the operation of the second embodiment. More specifically, the processing load of the terminal 14 is low in the second embodiment because the terminal 14 does not run the process that determines if a terminal movement was performed.

The disclosure is described above with reference to a preferred embodiment thereof, but the disclosure is not limited thereto and can be modified and adapted in many ways without departing from the scope of the accompanying claims.

For example, the recording device 12 does not send control data to the control server 10 in the foregoing embodiments, but may be configured to send control data. In this event, the control server 10 relationally stores the customer ID, transaction information, and control data when a specific condition is met. This enables providing services using the control data, and analyzing purchasing activity by customer ID.

In the foregoing embodiments the terminal 14 determines if the terminal 14 is on a sales floor using beacon signals that are transmitted from transmitters on the sales floor of the store. However, the terminal 14 may manage areas on the sales floor of a store, and based on the location of the terminal 14 and the areas on the sales floor in the store, determine if the terminal 14 is on a sales floor in the store.

The recording device 12 sends transaction-related information to the control server 10 in the foregoing embodiments. Configurations in which the POS terminal 8 sends the transaction-related information instead are also conceivable.

The disclosure being thus described, it will be obvious that it may be varied in many ways. Such variations are not to be regarded as a departure from the spirit and scope of the disclosure, and all such modifications as would be obvious to one skilled in the art are intended to be included within the scope of the following claims.

What is claimed is:

1. A transaction system comprising:
    a POS system configured to:
        identify transaction information related to a transaction, and transaction time information indicating a time at which the transaction was made; and
        transmit the transaction information and the transaction time information;
    a terminal comprising a state detection sensor including at least one of an acceleration sensor, a gyroscope sensor, and an inclinometer, wherein the terminal is configured to:
        detect, using the state detection sensor, that the terminal has performed a specific movement;

determine executed time information indicating a time at which the terminal performed the specific movement;
retrieve identification information; and
transmit the executed time information and the identification information; and
a control device configured to:
receive the transaction information and the transaction time information;
receive the identification information and the executed time information;
match the transaction information and the identification information based on the transaction time information and the executed time information; and
relationally store the matched transaction information and the identification information.

2. The transaction system described in claim 1, wherein: the POS system includes a POS terminal configured to transmit control data instructing executing a transaction-related process during a transaction, and
a processing device configured to execute a process based on the received control data, and to transmit the transaction information based on the control data and the transaction time information to the control device.

3. The transaction system described in claim 1, wherein: the terminal is configured to acquire positioning information indicating a position of the terminal, and when the terminal detects that the specific movement was performed, send the positioning information with the identification information and the executed time information to the control device; and
the control device is configured to identify a POS system as the POS system located at a location corresponding to the position of the terminal, based on the positioning information received from the terminal.

4. The transaction system described in claim 3, wherein: the terminal is configured such that when the terminal detects that the specific movement was performed, the terminal sends executed movement information identifying the specific movement with the identification information, the executed time information, and the positioning information to the control device; and
the control device is configured to store information identifying the POS system relationally to information specifying the specific movement, and
to relationally store the transaction information received with the transaction time information and the identification information received with the executed time information responsive to:
matching the transaction time information received from the POS system and the executed time information received from the terminal, and
matching the specific movement identified by the executed movement information and the information specifying the specific movement relationally stored with the information identifying the POS system.

5. The transaction system described in claim 1, wherein: the terminal is configured to determine that the terminal performed the specific movement when the terminal moves in a specific way.

6. The transaction system described in claim 1, wherein: the terminal is configured to determine that the terminal performed the specific movement when the terminal is positioned a specific way.

7. The transaction system described in claim 1, wherein: the terminal is configured to determine that the terminal performed the specific movement when the terminal is located in a specific area.

8. The transaction system described in claim 1, wherein: the terminal is configured to inform a user of the specific movement to perform.

9. The transaction system described in claim 1, wherein: the POS system is configured to inform the user of the specific movement that the terminal must perform.

10. An information processing method comprising:
a POS system identifying transaction information related to a transaction, and transaction time information indicating a time at which the transaction was made;
the POS system transmitting transaction information and the transaction time information;
a terminal that comprises a state detection sensor including at least one of an acceleration sensor, a gyroscope sensor, and an inclinometer:
detecting, using the state detection sensor, that the terminal has performed a specific movement;
determining executed time information indicating a time at which the terminal performed the specific movement;
retrieve identification information; and
transmitting the executed time information and the identification information; and
a control device:
receiving the transaction information and the transaction time information transmitted by the POS system;
receiving the identification information and the executed time information transmitted from the terminal;
matching the transaction information and the identification information based on the transaction time information and the executed time information; and
relationally storing the matched transaction information and the identification information.

11. The information processing method described in claim 10, wherein:
the terminal transmits the executed time information indicating responsive to the terminal detecting that the terminal performed the specific movement.

12. The transaction system described in claim 1, wherein: the control device is configured to identify, based on the executed time information, a record of checkout counter information that contains a checkout counter ID and transaction time information indicating a time chronologically closest to the time indicated by the executed time information of a plurality of records of checkout counter information.

13. The transaction system described in claim 1, wherein: the control device is configured to control, based on the related identification information, a processor, to provide a customer service to a customer identified by the identification information.

\* \* \* \* \*